W. J. Andrews,
Bee Hive.
No. 65,629. Patented June 11, 1867.

Witnesses:
F. Lehmann
Jno. A. Ellis

Inventor:
Wm. J. Andrews
by
J. H. Alexander & Co.
attorneys

United States Patent Office.

WILLIAM J. ANDREWS, OF COLUMBIA, TENNESSEE.

Letters Patent No. 65,629, dated June 11, 1867.

---

IMPROVEMENT IN BEE-HIVES.

---

The Schedule referred to in these Letters Patent and making part of the same.

---

TO ALL WHOM IT MAY CONCERN:

Be it known that I, WILLIAM J. ANDREWS, of Columbia, Maury county, Tennessee, have invented certain new and useful Improvements in Bee-Hives; and I declare the following is a full, true, and exact description of the same, reference being had to the accompanying drawings, which form a part of these specifications, and the letters of reference marked thereon.

Figure 1:
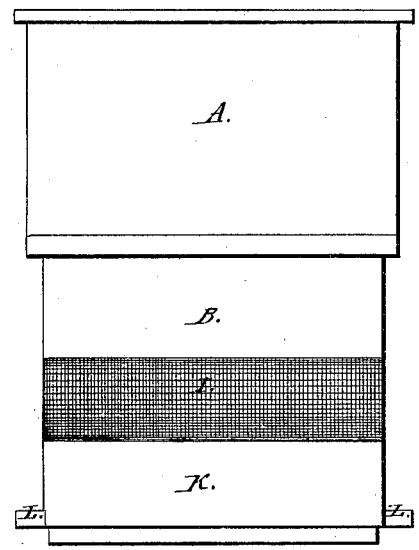
Figure 1 represents a front view of my bee-hive with a moth-trap attached.
Figure 2:
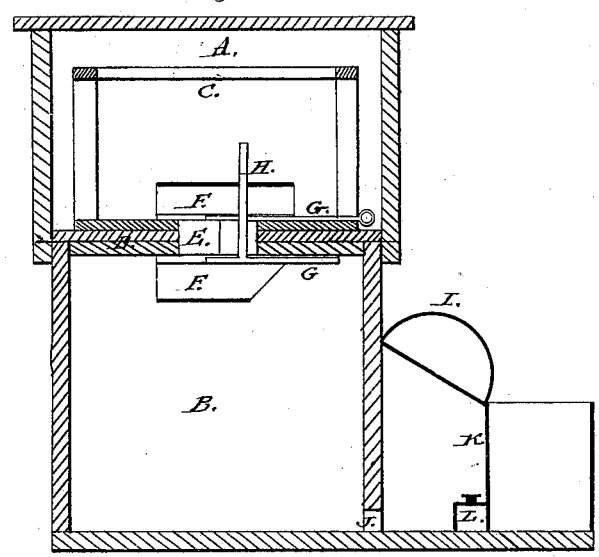
Figure 2 represents a section view of the same.

The hive is formed of two boxes A B, and is so constructed that the upper box A can be removed at pleasure. Letter C, fig. 2, represents a frame upon which the bees build their combs. Between the boxes A B is placed the movable cover D, which is perforated at the point E so as to allow the bees to pass from one box to the other. Over and below the aperture E is placed the two semicircular pieces of tin F F, and to each of these semicircular pieces is attached a movable cover or cap, G G, which are connected together by the upright rod H, and are used for the purpose of closing the aperture between the boxes A B, so as to prevent the bees from passing from one box to the other while the honey is being removed. When you wish to remove the honey, close the aperture between the boxes by the caps or covers, thus securing the bees to both apartments so that they cannot fly around while the operation is being performed, and thus saving the necessity of using smoke. The semicircular pieces also serve to prevent the bees from joining their combs together. The letter J represents the entrance for the bees to the lower box B. In front of the entrance is placed the moth-trap K, having the movable grated lid or cover, I, so as to prevent the bees from leaving the hive while the honey is being removed, or can be closed at night in order to prevent the moths from entering the hive and disturbing the bees. In the box K is placed the trough L, in which food is placed for the bees.

The advantages of my hive are, the use of smoke, which is so detrimental to the honey, is entirely done away with, and the honey can be removed without the trouble or danger of being annoyed by the bees during the operations.

Having thus described my invention, what I claim, and desire to secure by Letters Patent, is—

1. The semicircular pieces F F, the movable covers or caps G G, and the upright bar H, when used in the manner and for the purpose as herein specified.

2. I claim the moth-trap K, when it is provided with the grated cover I, and feeding trough L, arranged in the manner and for the purpose specified.

In testimony that I claim the foregoing as my own, I hereby affix my signature in the presence of two witnesses.

WM. J. ANDREWS.

Witnesses:
J. B. ALDERSON,
WM. M. SULLIVAN.